(12) United States Patent
Romeo

(10) Patent No.: US 12,125,987 B2
(45) Date of Patent: Oct. 22, 2024

(54) BATTERY GRID LEAD SCRAP MELTING APPARATUS AND METHOD

(71) Applicant: Wirtz Manufacturing Company, Inc., Port Huron, MI (US)

(72) Inventor: Michael Romeo, St. Clair, MI (US)

(73) Assignee: Wirtz Manufacturing Company, Inc., Port Huron, MI (US)

(*) Notice: Subject to any disclaimer, the term of this patent is extended or adjusted under 35 U.S.C. 154(b) by 73 days.

(21) Appl. No.: 17/744,829

(22) Filed: May 16, 2022

(65) Prior Publication Data

US 2022/0285739 A1    Sep. 8, 2022

Related U.S. Application Data

(62) Division of application No. 16/274,644, filed on Feb. 13, 2019, now abandoned.

(51) Int. Cl.
*H01M 10/12* (2006.01)
*H01M 4/73* (2006.01)

(52) U.S. Cl.
CPC ............ *H01M 10/12* (2013.01); *H01M 4/73* (2013.01)

(58) Field of Classification Search
CPC .......... H01M 10/12; H01M 4/73; H01M 4/84; C22B 1/248; C22B 13/025; B22D 11/001; B22D 25/04
USPC ........... 266/107, 200, 901; 428/576; 75/687, 75/572
See application file for complete search history.

(56) References Cited

U.S. PATENT DOCUMENTS

| 1,951,932 A | 3/1934 | Henry et al. |
| 3,864,092 A | 2/1975 | Ravitz |
| 4,491,475 A | 1/1985 | Zuber et al. |
| 5,776,225 A * | 7/1998 | Megy ................. C22B 1/24 241/3 |
| 5,873,304 A | 2/1999 | Ruf |
| 6,350,295 B1 * | 2/2002 | Luyckx ............... C22B 1/24 75/568 |
| 6,895,644 B2 * | 5/2005 | Wirtz .................. H01M 4/73 29/2 |

(Continued)

FOREIGN PATENT DOCUMENTS

| CN | 206921925 | * | 1/2018 | ........... C22B 13/025 |
| EP | 0367859 A1 | | 5/1990 | |

(Continued)

OTHER PUBLICATIONS

European Office Action for European Application No. 20 157 203.9-1103 dated Jun. 12, 2023 (7 pages).

(Continued)

*Primary Examiner* — Jessee R Roe
*Assistant Examiner* — Michael Aboagye
(74) *Attorney, Agent, or Firm* — REISING ETHINGTON, P.C.

(57) ABSTRACT

An apparatus and process for melting and using scrap pieces of lead or lead alloy from making a web of connected grids for a lead acid battery by forming holes through a solid strip of lead or lead alloy. The scrap pieces may be compacted into briquettes which are submerged in a pool of liquid lead or lead alloy below the top surface of the pool and melt in the pool. Liquid lead from the pool may be cast into solid strips from which webs of grids are made.

11 Claims, 11 Drawing Sheets

(56) References Cited

U.S. PATENT DOCUMENTS

| | | | | |
|---|---|---|---|---|
| 8,875,361 B2* | 11/2014 | Wirtz | ............... | H01M 4/84 |
| | | | | 29/2.25 |
| 9,187,801 B2* | 11/2015 | Kim | ............... | B30B 9/327 |
| 10,957,942 B2* | 3/2021 | Romeo | ............... | H01M 4/73 |
| 2006/0110485 A1 | 5/2006 | Ruf | | |
| 2015/0375467 A1 | 12/2015 | Ruf | | |

FOREIGN PATENT DOCUMENTS

| | | |
|---|---|---|
| EP | 2507045 B1 | 10/2013 |
| JP | 2005163169 A | 6/2005 |
| JP | 2005325397 A | 11/2005 |
| WO | WO03016033 A1 | 2/2003 |
| WO | WO2004018188 A1 | 3/2004 |

OTHER PUBLICATIONS

EP Application No. 20157203.9-1103, Wirtz Manufacturing Co., Inc. European Search Report dated May 8, 2020.
European Office Action for European Application No. 20 157 203.9 dated Nov. 10, 2022 (6 pages).

* cited by examiner

BATTERY GRID LEAD SCRAP MELTING APPARATUS AND METHOD

CROSS-REFERENCE TO RELATED APPLICATION

This application is a divisional of U.S. patent application Ser. No. 16/274,644, with a filing date of Feb. 13, 2019, the contents of which are hereby incorporated by reference.

TECHNICAL FIELD

The present invention relates generally to the melting and use of lead scrap and more particularly to the melting and use of lead scrap in the manufacture of grids for lead acid batteries.

BACKGROUND

The grids of a lead acid battery are made of a lead or a lead alloy (hereinafter referred to as lead) and the commercial manufacture of lead grids, particularly for positive electrodes, produces a significant amount of solid lead scrap in the form of small pieces of lead from punching, slitting, and trimming operations which must be re-melted for reuse in making lead grids.

Grids for lead acid batteries may each have a plurality of spaced apart wire segments interconnected at nodes and a plurality of open spaces between the wire segments. The manufacture of a web of a plurality of serially connected lead grids by punching holes through a cast or cast and rolled solid strip of lead typically produces 80% or more by weight of scrap from the solid lead strips. Thus, to economically form lead grids, it is necessary to re-melt and use this scrap in forming long strips of solid lead. While these punched pieces of scrap vary in geometry, they most generally have a thickness in the range of about 0.020 to 0.045 of an inch and a width and length typically each of which does not exceed about 0.6 of an inch. Punched scrap or slugs often are generally rectangular in shape but may be square, trapezoidal, triangular, etc.

When casting solid lead strip the scrap typically is returned to a furnace which already has a pool of liquid lead therein. The scrap pieces tend to float on the surface of the liquid lead where they are quickly oxidized with a significant portion by weight becoming dross and also may have their alloy content significantly reduced. A portion of the scrap may also sink into the liquid lead to the bottom of the furnace where it often piles up into a glob or mass of small lead particles that require excessively high furnace temperatures to melt and liquefy them which also creates increased oxidation, dross, and shorter equipment life. Significant oxidation and dross produces lead scrap that cannot be reused and thus must be removed, typically manually, from the surface of the pool of lead in the furnace and smelted in a separate furnace usually with alloys being added before it can be re-used to cast a solid lead strip. Significant oxidation and dross of lead alloy scrap dramatically changes and reduces its alloy content. Excessive dross also significantly increases lead dust and vapor fumes in the air which may have a negative effect on human health and the environment.

SUMMARY

In at least some implementations, a process of liquefying a multitude of pieces of scrap of lead or a lead alloy may include several steps. One step may involve heating a lead or lead alloy by way of a furnace to a temperature of 650° F. or more in order to provide a pool of liquid lead or lead alloy. The pool of liquid lead or lead alloy has a surface. The furnace has a pot with an open top. Another step may involve compacting numerous pieces of scrap of lead or lead alloy at room temperature into briquettes. The briquettes may have a density of 10.3 g/cm³ or more, and may have a weight of 1 kg or more. Yet another step may involve dropping the briquettes from 0.15 meters or more above the surface of the pool and through the open top of the pot. The briquettes go into the pool, through the pool's surface. The briquettes are submerged in the pool and completely below the pool's surface, and are melted therein.

In at least some implementations, a process of making a web of connected battery grids with lead or lead alloy may include multiple steps. One step may involve providing a pool of liquid lead or lead alloy. The pool has a surface. Another step may involve casting from some or more of the liquid lead or lead alloy of the pool a longitudinally elongate solid strip of lead or lead alloy of a predetermined thickness. Yet another step may involve reducing the predetermined thickness of the solid strip. Still another step may involve punching holes through the solid strip to form a web of a multitude of serially-connected battery grids. The step of punching produces multiple pieces of scrap of lead or lead alloy. Another step may involve compacting the pieces of scrap of lead or lead alloy at room temperature into briquettes. The briquettes may have a density of 10.3 g/cm³ or more, and may have a weight of 1 kg or more. Yet another step may involve dropping the briquettes from 0.15 meters or more above the surface of the pool and into the pool through the surface. The briquettes are submerged in the pool and completely below the pool's surface, and are melted therein.

BRIEF DESCRIPTION OF THE DRAWINGS

Embodiments of the disclosure are described with reference to the appended drawings, in which.

DETAILED DESCRIPTION

Figure 1:
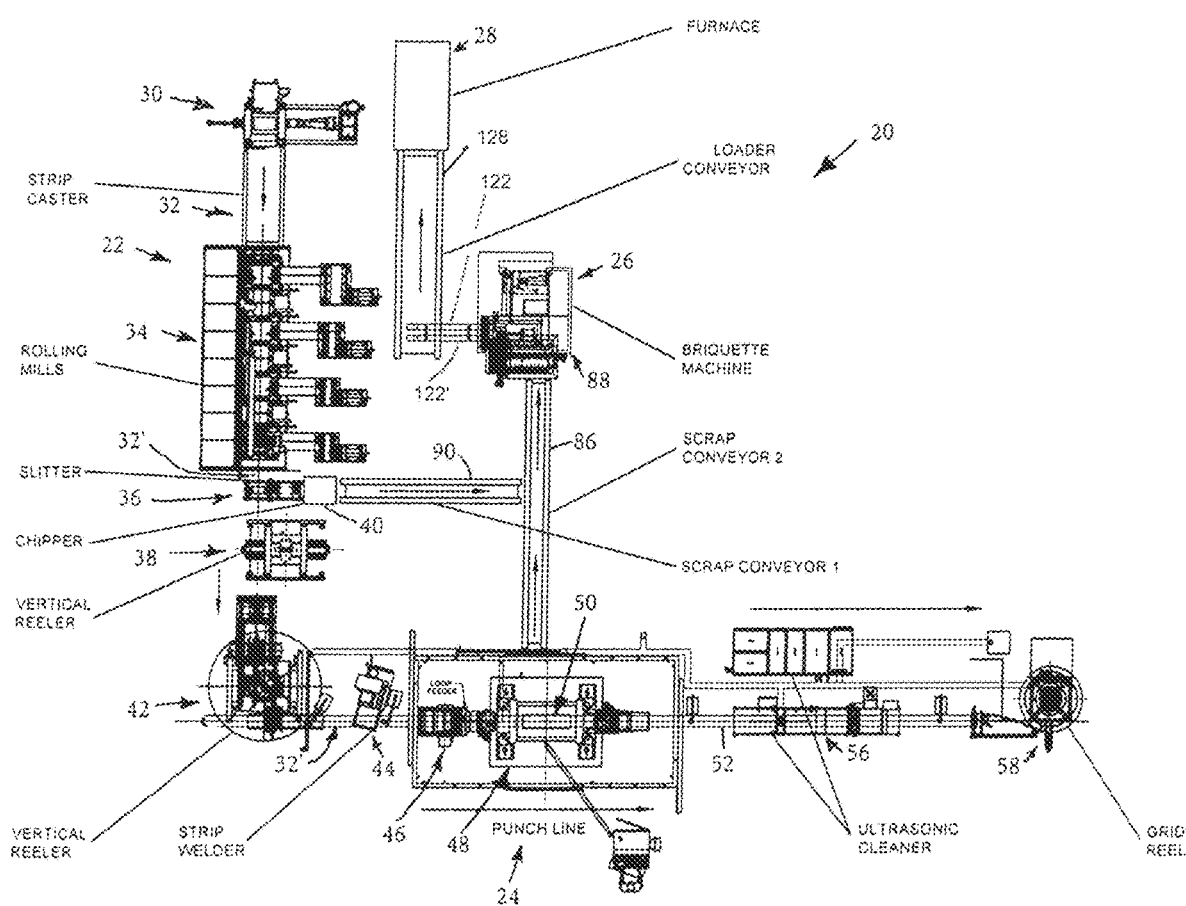
FIG. 1 is a schematic view of a suitable industrial manufacturing line for casting a solid strip of lead, punching it to produce a web of grids for lead acid batteries and to re-melt and use scrap produced by manufacture of webs of multiple grids.
Figure 2:
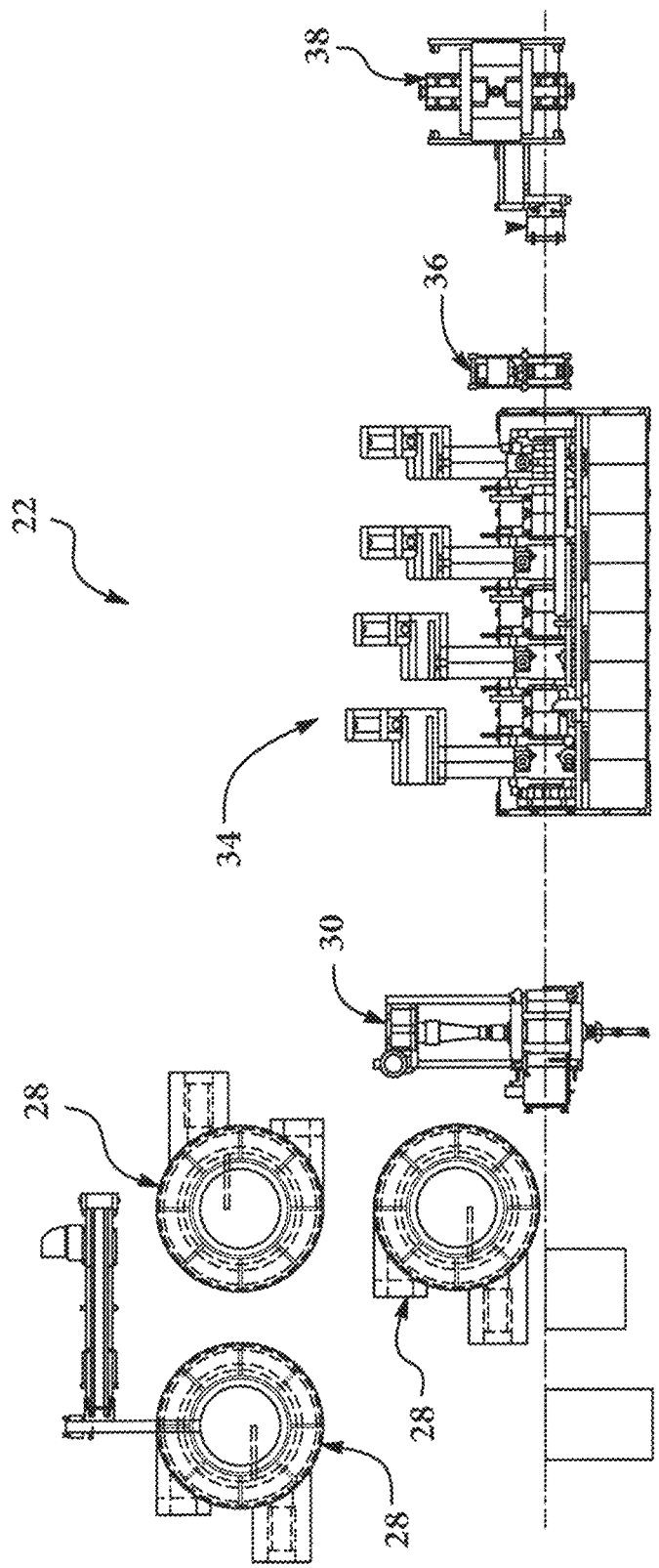
FIG. 2 is an schematic view of a melting furnace, strip caster, trimmer, and reeler of the manufacturing line of FIG. 1.

A process of making a web of serially connected battery grids may include forming holes through a solid strip of lead which produces lead scrap pieces such as slugs from die punching operations. Pieces of the lead scrap may be compacted into briquettes which will readily submerge in a pool of liquid lead completely below the surface of the pool. Liquid lead from the pool may be used to cast a solid strip of lead from which the web of grids may be made. The briquettes of scrap may have a density of at least 10.3, desirably 10.6, and preferably 11.0 grams per cubic centimeter [$g/cc^3$] and a weight of at least 1 kilogram (kg), desirably 2 kg and preferably 8 kg to 25 kg. In mass production of battery grids the briquettes may be added to the pool of liquid lead at a rate of at least 1,900 kg, desirably 2,300 kg and preferably 3,000 kg to 4,800 kg per hour. The pool of liquid lead may be at a temperature of at least 650° F. and desirably in the range of 750° F. to 950° F. The solid strip may be cast by a continuous caster at a rate of 2,300 kg per hour and desirably 3,900 kg to 6,300 kg per hour. For automotive lead acid batteries the solid strip may be reduced to a thickness in the range of about 0.020 to 0.045 of an inch [0.50 to 1.15 centimeters (cm)] and the webs of grids formed at a rate of about 80 to 150 linear feet per minute (24 to 46 lineal meters per minute).

Referring in more detail to the drawings, FIG. 1 illustrates a suitable production line 20 which may implement this process by casting longitudinally elongate solid strips of lead and producing longitudinally elongate webs each with a plurality of lead acid battery grids connected in series, and by recovering, re-melting and using scrap pieces of lead produced by trimming and/or punching operations in making a web of a series of connected grids from a solid strip of lead. This production line may include a lead solid strip casting line 22, a grid forming line 24, a scrap compacting line 26, and one or more furnaces 28 which melt lead and supply liquid lead to the casting line 22.

The casting line 22 may have a casting machine 30 which in use casts a longitudinally elongate continuous strip 32 of solidified solid lead. This strip is typically passed through a series of rolling mills 34 which successively reduce the thickness and increase the longitudinal extent or length of the cast strip. In each rolling mill 34, the strip may pass through the nip of a pair of co-rotating rollers to reduce the thickness of the strip. The strip 32' emerging from the downstream rolling mill 34 may pass through an edge trim cutter and/or slitter 36 and may be wound into a coil or coils by a reeler machine 38 for subsequent further processing. If the trim cutter or slitter 36 produces long pieces of scrap they may be broken into smaller pieces of scrap by a chipper 40. Typically, the caster may produce a lead solid strip 32 with a thickness in the range of 0.18 to 0.5 of an inch (4.5 to 13.0 mm) and a width in the range of 4 to 14 inches (100 to 360 mm) at a rate in the range of 3 to 20 lineal feet (1 to 6 meters) per minute. Typically the rolling mills 34 collectively may reduce the nominal thickness of the cast strip 32 to an elongate strip 32' of about 0.020 to 0.045 of an inch (0.5 to 1.15 mm) thick. A suitable lead solid strip casting line is disclosed in United States Published Application US-2018-0342770-A1 of the present Applicant, Wirtz Manufacturing Company of Port Huron, Michigan, U.S.A., the disclosure of which is incorporated herein by reference in its entirety and thus the casting line will not be described in further detail herein.

The grid forming line 24 may include a reeler 42 which unwinds coils of solid lead strips 32' which may advance through a welder 44, to a loop feeder 46 which supplies the solid strip to a press 48 with a progressive die set 50 which punches holes through the lead strip to form a web 52 of a series of connected lead grids 54. The welder 44 may butt weld together the adjacent ends of individual solid lead strips to provide a substantially continuous longitudinally elongate strip 32' fed to the progressive die set. The web 52 of lead grids 54 may pass through an ultrasonic cleaner 56 and be wound into coils by a reeler 58 for further processing of the webs 52 of connected grids.

Figure 3:
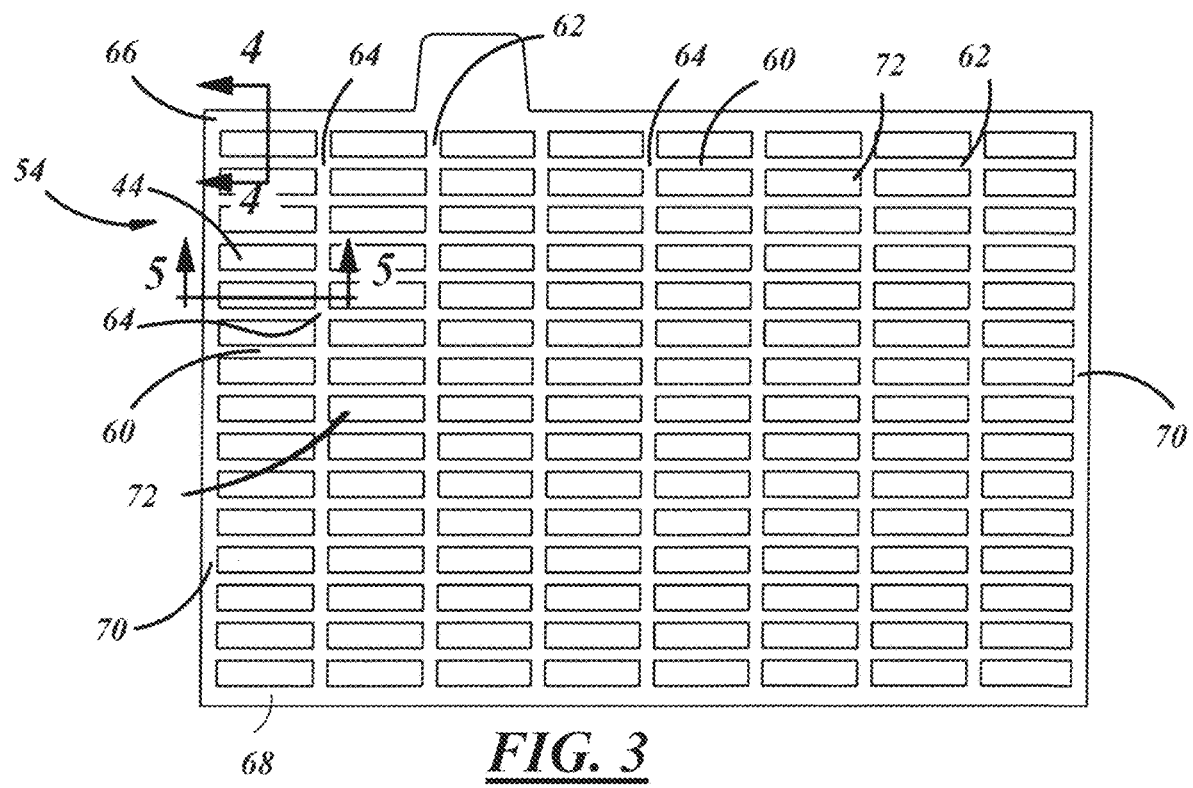
FIG. 3 is a plan view of one grid of a web of connected grids produced by a progressive punching die set of the manufacturing line of FIG. 1.
Figure 4:
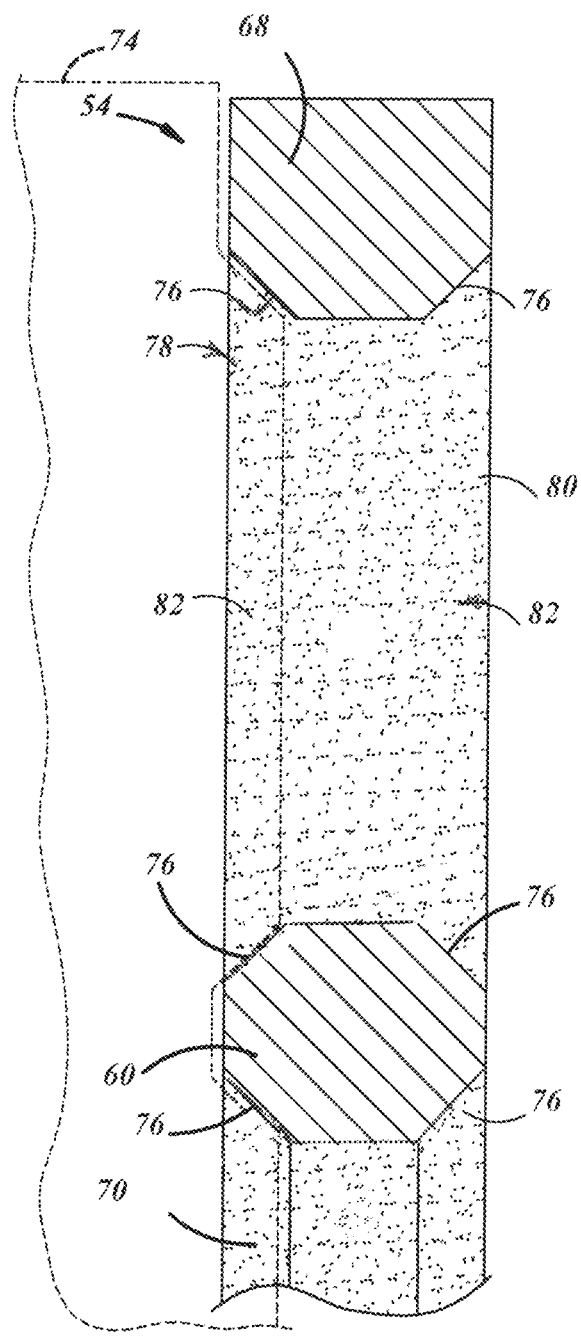
FIG. 4 is a fragmentary sectional view taken generally on line 4-4 of FIG. 3.
Figure 5:
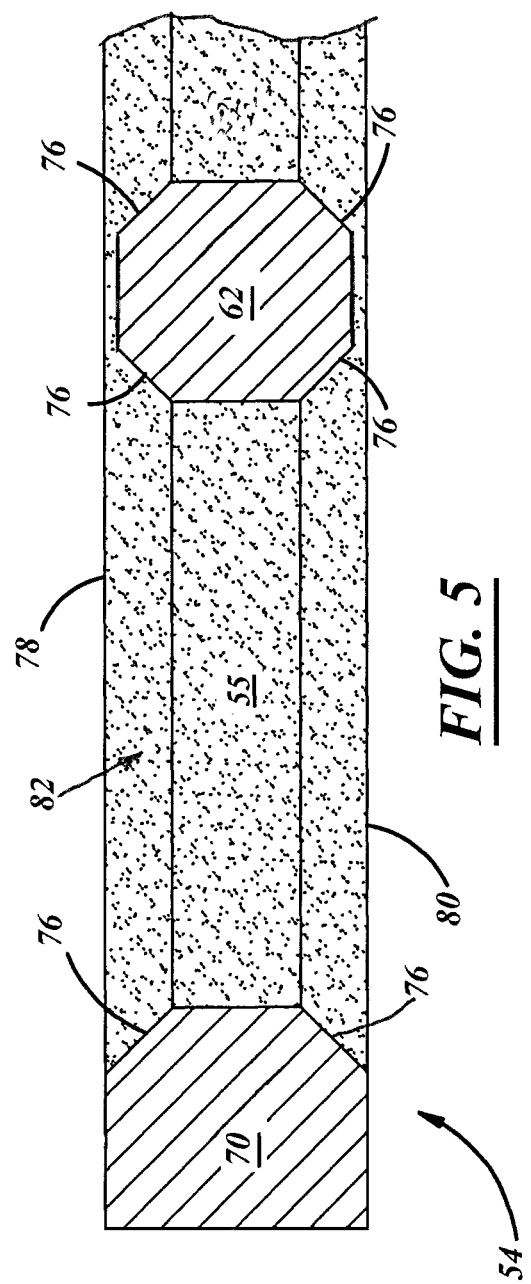
FIG. 5 is a fragmentary sectional view taken generally on line 5-5 of FIG. 3.

As shown in FIG. 3 the progressive die set 50 may form each grid 54 of the web 52 with a plurality of generally horizontally or longitudinally extending wire segments 60 and a plurality of generally vertically extending wire segments 62 intersecting and joined with the horizontal wire segments at nodes 64. Each grid perimeter may also include a frame 66 of generally horizontally extending segments 68 and generally vertically extending segments 70. The frame and wire segments may be formed by punching out portions of the solid strip to form through openings, holes or spaces 72 between the wire segments. The punching die will initially form the wire segments with a generally rectangular cross-section which if desired may be stamped or coined by a suitable die 74 as shown in FIGS. 4 and 5 to form angled lands 76 on the wire segments which are inclined to the generally planar and parallel outer faces 78, 80 of each grid. These angled lands 76 may be formed by either a portion of the progressive die set 50 or by a separate stamping or coining die set and press downstream of the progressive die set 50. To increase the adhesion of subsequently applied and cured battery paste to the grid wires, some or all of their exterior surfaces may be formed with a controlled surface roughness 82 which may be produced by stamping or coining operations. A suitable method, apparatus and line for punching a lead solid strip to produce a web of grids is disclosed in U.S. Pat. No. 8,875,361 of Applicant the disclosure of which is incorporated herein by reference in its entirety and thus this grid forming line 24 will not be described in further detail herein.

Figure 6:
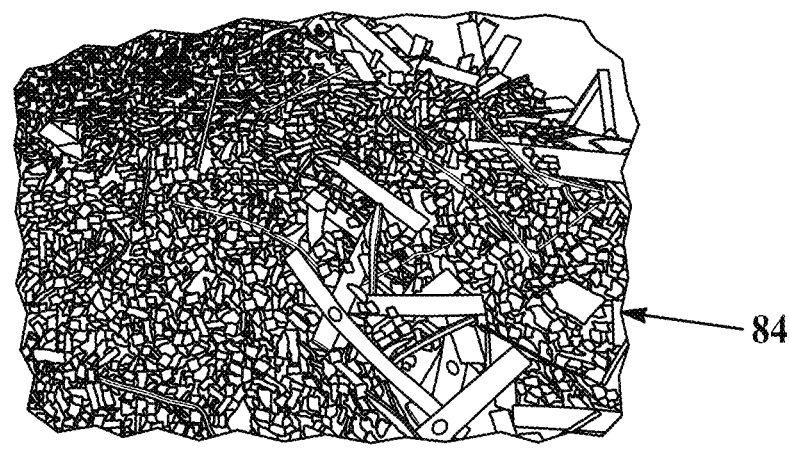
FIG. 6 is a semi-schematic view of lead scrap.

The punching of the lead solid strip 32' to form the grids 54 produces significant quantities of scrap lead pieces 84 (FIG. 6) which may be advanced by a conveyor 86 to a compacting press 88 which forms briquettes of the scrap which are returned to the furnace 28. Typically, the grid forming press 48 and progressive punching die set 50 will produce about 125 to 175 lineal feet (40 to 55 lineal meters) per minute of a web 52 of connected grids 54 with a thickness of about 0.020 to 0.045 of an inch (0.5 to 1.15 mm) and a transverse web width of about 4 to 14 inches (100 to 360 mm) and typically produce four or more tons (3,100 kg) per hour of scrap lead pieces 84 which is usually at least 65% and typically about 80% to 85% by weight of the solid lead strip 32'. Scrap 84 from the trimmer 36 and chipper 40 may also be advanced by a conveyor 90 to the conveyor 86 and thus to the compacting press 88.

In the compacting line 26 a plurality of pieces of scrap 84 may be compacted into a block or briquette having sufficient integrity that it will not readily separate into small pieces and of sufficient density so that when dropped onto the top surface of a pool of liquid lead in a furnace it will readily sink below the surface of the pool of liquid lead and toward the bottom of the pool of lead. It is believed that the ability of a briquette of scrap lead pieces to submerge below the surface of a pool of liquid lead and toward the bottom of a pool of liquid lead is primarily a function of the buoyancy of the liquid lead acting on the briquette. Unless dropped or propelled from above the top surface of the pool of liquid lead in theory and in accordance with Archimedes' principle the briquette must have sufficient density (weight per unit of volume) at least substantially equal to the buoyancy of the liquid lead in the furnace which for liquid lead at a temperature of about 650° F. to 750° F. is about 10.58 g/cm$^3$ and at a temperature of 950° F. is about 10.43 g/cm$^3$.

It is believed that lead scrap compacted into a briquette weighing at least about 1 kg and having a density of at least about 10.6 g/cm$^3$ when dropped from at least 0.5 feet (0.15 meter) above the top surface of a pool of liquid lead at a temperature of 750° F. substantially vertically into such pool will readily and rapidly sink below the top surface of such pool (assuming the same gravitational force on both the briquette and the pool of liquid lead) and be melted therein. Some empirical testing and resulting data indicates that a briquette in the form of a cylinder 90 (FIG. 7) of lead scrap having a density of 11.0 g/cm$^3$ and a weight within a range of 5 to 10 lbs. (2 to 4 kg) when dropped from 0.5 feet (0.15 meter) above and substantially vertically into a pool of liquid lead at 750° F. readily and rapidly is submerged completely below the surface of the pool of liquid lead and melted therein without producing any significant dross and without a loss of Calcium and tin alloys in a lead calcium tin alloy typically used in making lead acid battery grids. A briquette of scrap lead pieces in the form of a block, hexahedron, or parallelepiped 92 (FIG. 8) having a density of about 11.1 g/cc$^3$ and a weight of about 30 pounds (12.6 kg) when dropped from 0.5 feet (0.15 meter) above the surface of and substantially vertically into a pool of liquid lead at 750° F. readily and rapidly submerges completely below the surface of the pool of liquid lead and is melted therein without producing any significant dross and without loss of its calcium, tin, and calcium tin alloys. These briquettes 90, 92 of scrap lead pieces may be added to a pool of 16,000 to 60,000 pounds (3,200 to 23,600 kg) of liquid lead nominally at 750° F. at the rate of about 8,000 lbs. (3,100 kg) per hour when and as liquid lead is supplied to the caster of solid strips at the rate of about 12,000 lbs. (4,800 kg) per hour along with additional solid lead being added to and melted in the pool of liquid lead at the rate of about 2,000 to 4,000 lbs. (780 to 1,560 kg) per hour. Typically, the added lead is in the form of so called "pigs" of 60 to 100 lbs. (25 to 40 kg) each or "hogs" of 500 to 2,000 lbs. (200-800 kg) each of solid lead at room temperature. It may be desirable to use briquettes of at least 5 pounds and preferably 20 to 60 pounds (8 to 25 kg) and a density of at least 10.6 and desirably 10.8 g/cc$^3$ supplied to the pool of liquid lead at a rate of at least 5,000 (1,900 kg) and as much as 8,000 to 12,000 pounds (3,100 to 4,800 kg) per hour depending on the capacity of the caster of the lead solid strip.

Figure 10:
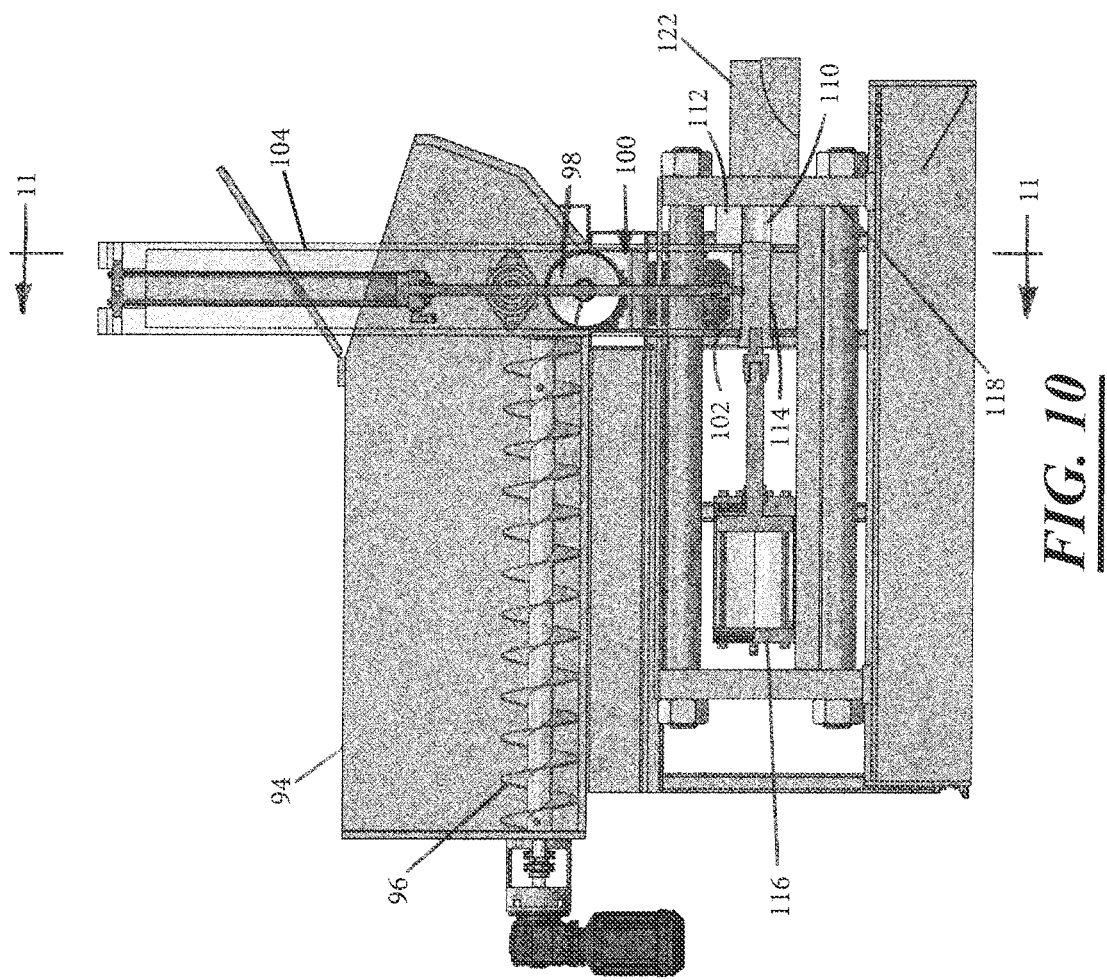
FIG. 10 is a semi-schematic sectional view of a portion of the compacting press of FIG. 9.
Figure 11:
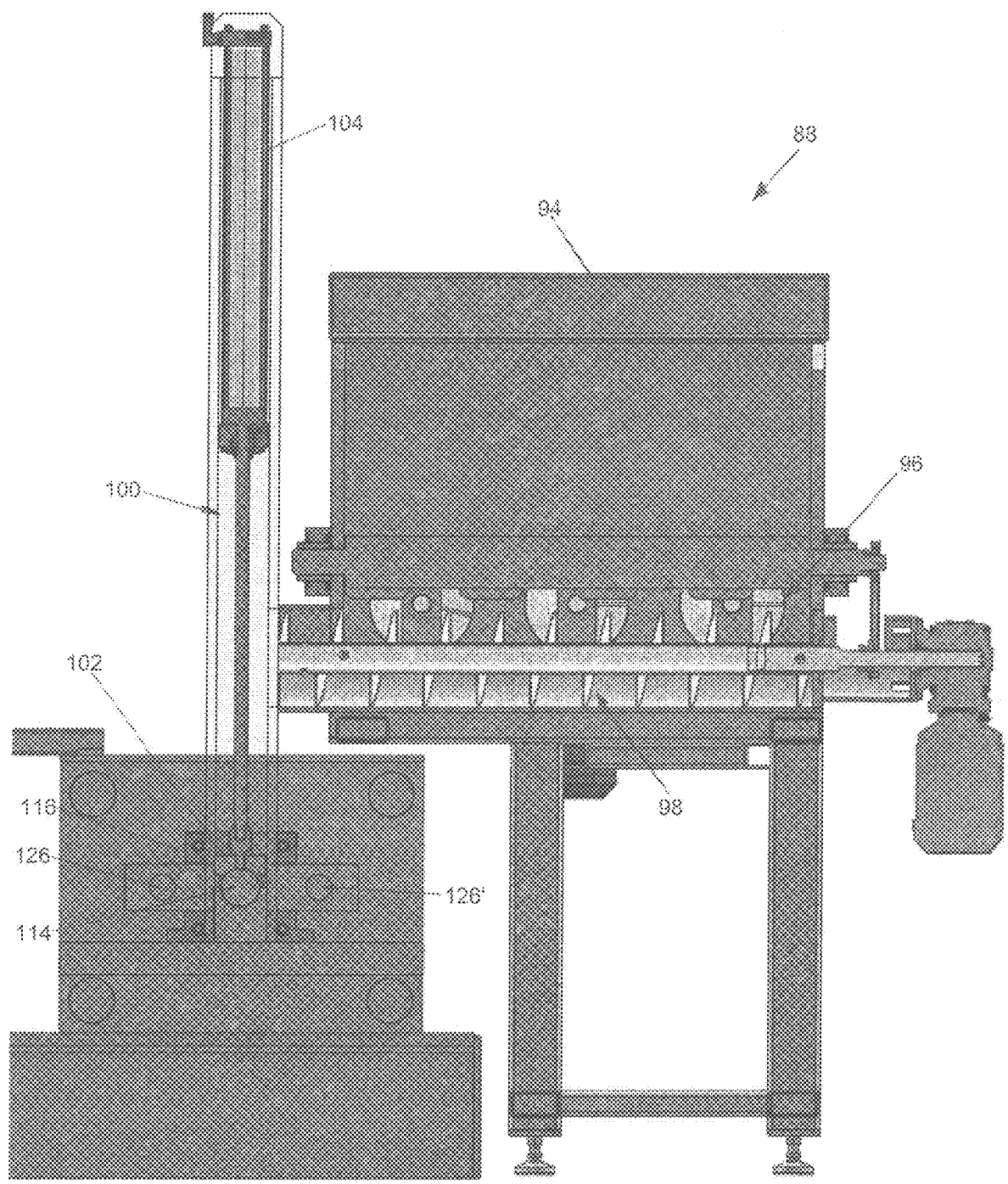
FIG. 11 is a semi-schematic fragmentary sectional view of the press taken generally on line 11-11 of FIG. 10.
Figure 12:
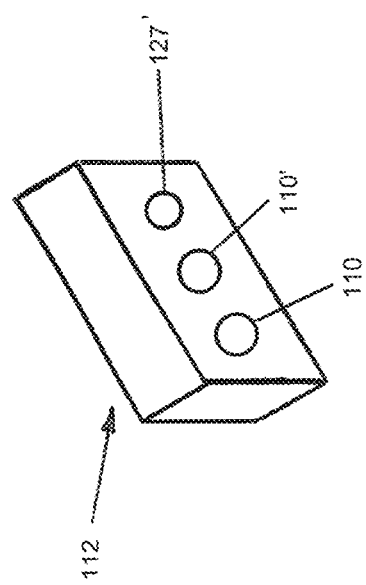
FIG. 12 is a perspective view of a die block of the press of FIG. 9.

A suitable press 88 for compacting scrap lead pieces into briquettes is semi-schematically illustrated in FIGS. 9-13. This press compacts scrap pieces 84 in two stages to form a briquette. The compacting press may have a hopper 94 in which scrap pieces 84 are received and moved by rotating augers 96 toward an intermittently rotating auger 98 which intermittently feeds scrap pieces into an elongate chamber or cavity 100 in which a pressing plate 102 (FIG. 11) is movable between retracted and extended positions by a hydraulic ram 104 which in operation is actuated by pressurized hydraulic oil supplied by a hydraulic pump 106 driven by an electric motor 108. As shown in FIGS. 10 and 11 in the first stage the ram 104 extends the plate 102 to partially compact a quantity or batch of scrap pieces 84 in the cavity 100. In the second stage, this partially compacted scrap is transferred into one of two transversely spaced apart die cavities 110, 110' through a reciprocative die plate 112 (FIG. 12) and further compacted therein to form a briquette by a plunger 114 with a complimentary cross-section being advanced through the chamber 100 and into one of the die cavities 110 or 110' by a hydraulic ram 116. The distal end of this die cavity is closed or covered by an adjacent planar face of a plate 118. The die plate 112 is moved back and forth by a hydraulic ram 120 to alternately align one and then the other of the die cavities 110, 110' with the plunger 114.

This briquette is removed from its associated die cavity 110 or 110' and transferred to one of two outlet troughs 122 or 122' by retraction of the plunger 114, lateral movement of the die plate 112 by the hydraulic ram 120 to align the cavity 110 or 110' with the formed briquette therein with one of the two spaced apart exit holes 124, 124' through the plate 118, and thereafter advancement of associated ejector pins 126, 126' by the hydraulic ram 116 which also simultaneously again advances the plunger 114 through the cavity 100 and into the other empty die cavity 110' or 110 to form another briquette therein. The die plate 112 also has a clearance through hole 127' for the ejector pin 126'. Each time the plunger 114 is retracted from one of the cavities 110 or 110' the die plate is advanced or retracted by the hydraulic ram 120 to align the other cavity 110' or 100 with the plunger. The ram 104 and auger 98 are cycled to recharge the cavity 100 with a new batch of scrap pieces and partially or pre compact them therein for transfer and further compaction in the empty one of the two die cavities 110, 110'. Thus, in operation the press 88 alternately compacts a briquette in one die cavity 110 or 110', while transferring a formed briquette out of the other die cavity 110' or 110 and onto one of the two troughs 122, 122'. Thus, formed briquettes are alternately transferred to one and then the other of the two troughs.

Figure 7:
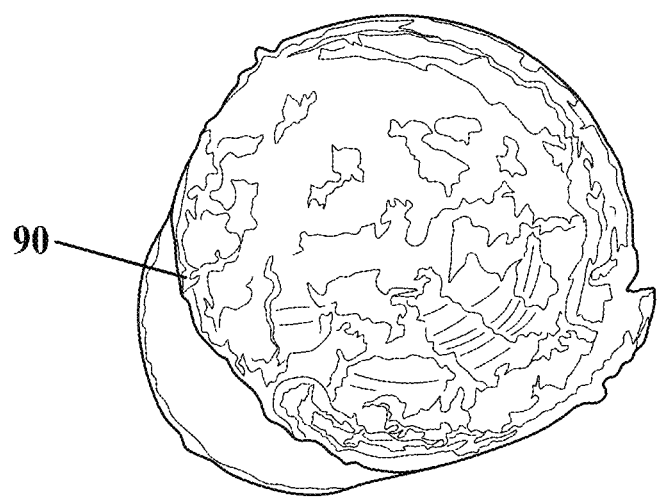
FIG. 7 is a perspective view of a mass of lead scrap compacted into one form of a briquette.
Figure 8:
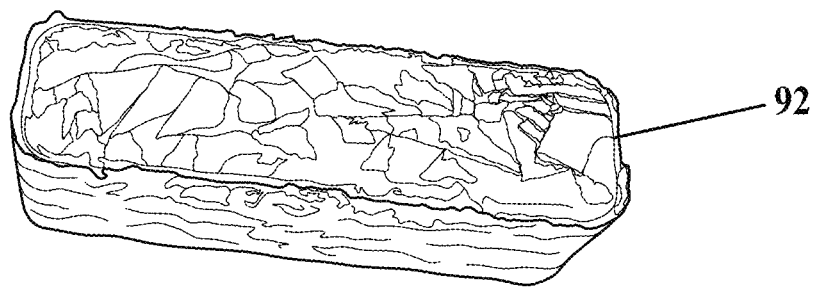
FIG. 8 is a view of a mass of lead scrap compacted into another form of a briquette.
Figure 9:
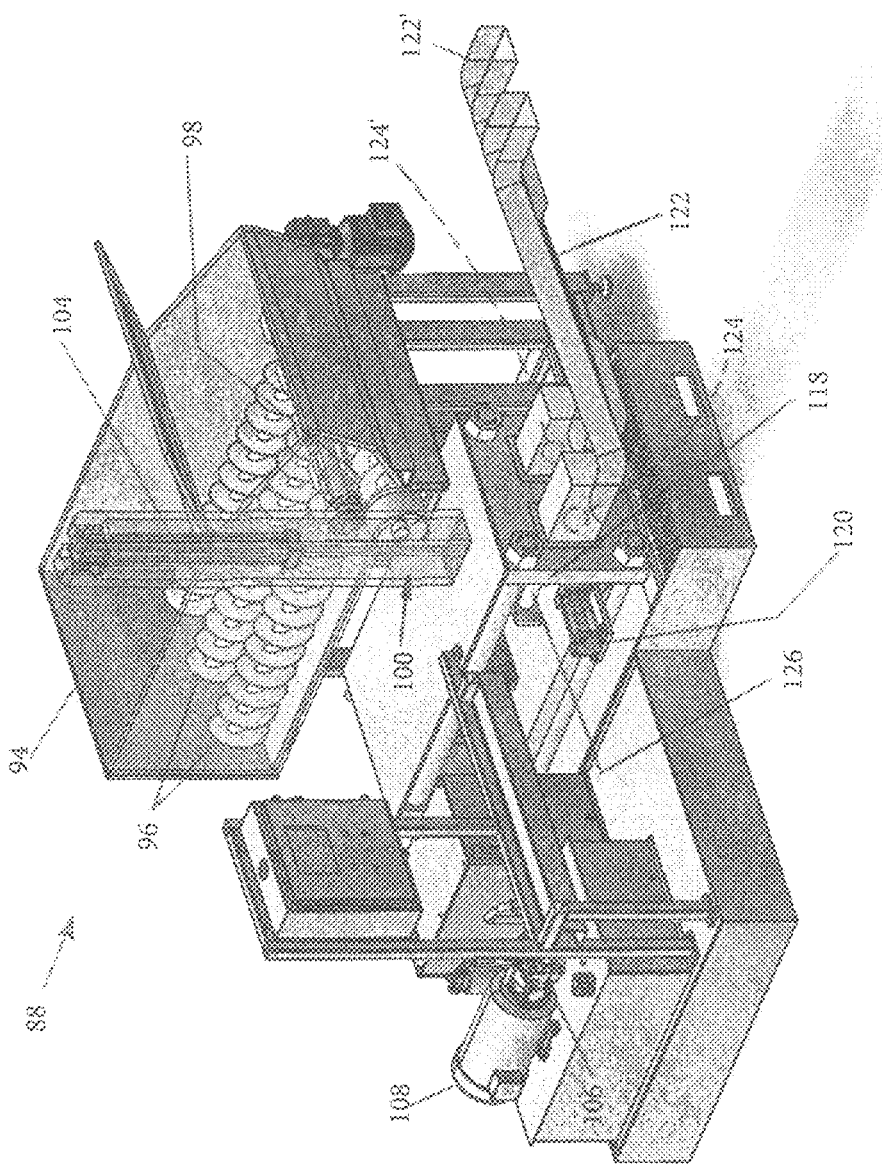
FIG. 9 is a perspective view of a scrap compacting press of the line FIG. 1.
Figure 13:
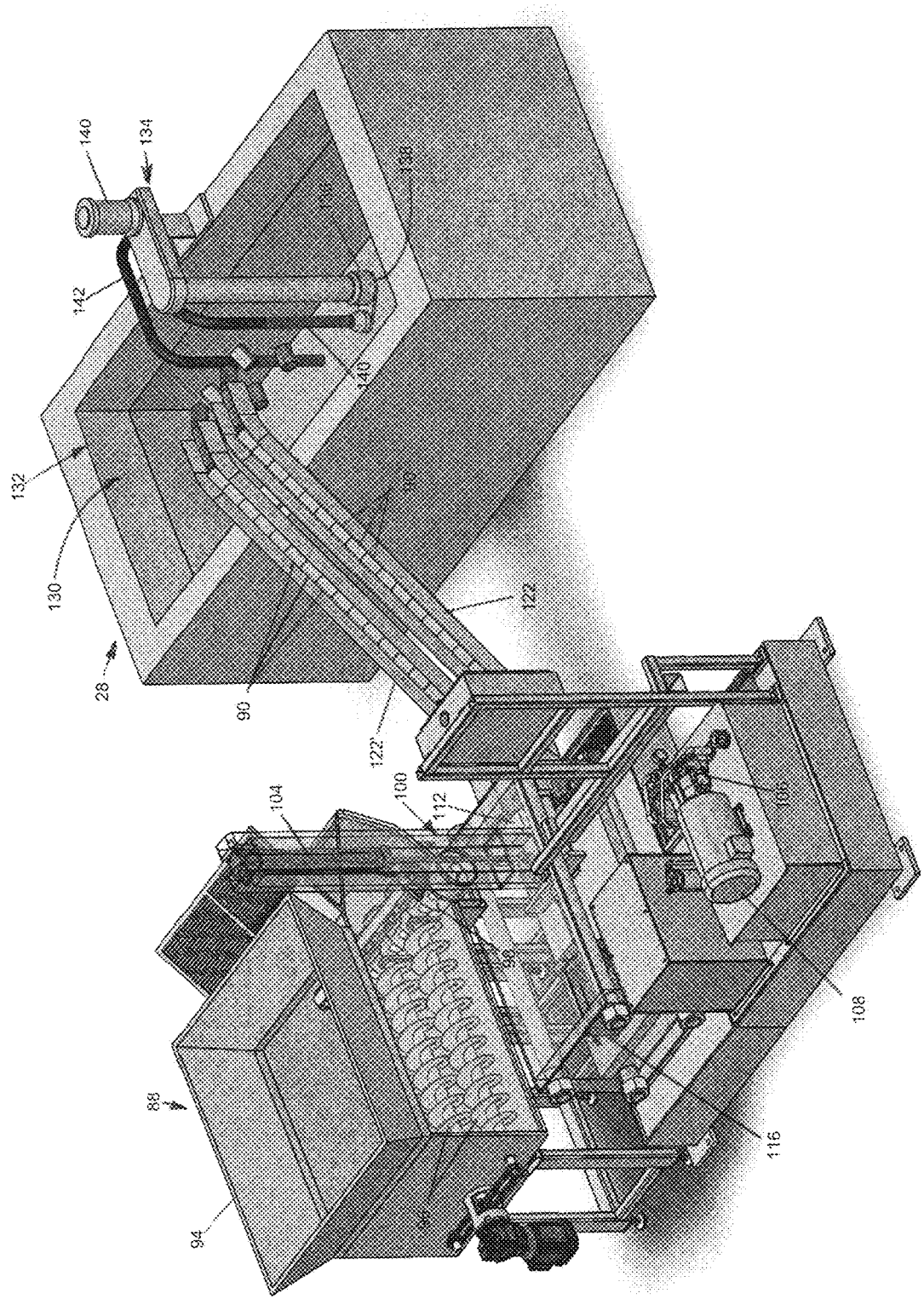
FIG. 13 is a semi-schematic schematic perspective view of the compacting press and a melting furnace of the line of FIG. 1.

As shown in FIG. 13, once a trough is full of abutting briquettes, each transfer of another briquette into the trough also advances all downstream briquettes and typically discharges a briquette from the other end of the trough either onto a conveyor 128 (FIG. 1) which delivers the briquettes to the furnace 28 or directly into the furnace 28 (FIG. 13). The briquettes produced by this press may be generally cylindrical 90 as shown in FIG. 7 or desirably rectilinear 92 as shown in FIG. 8. The compacted briquettes may be in the form of a cylinder, square, hexahedron, parallel-piped, or of another shape as will apparent to one skilled in the art. A suitable compacting press is available from RUF US, Inc., 771 Sugar Lane, Elyria, Ohio, USA 44035 as model No. RUF1100.

As shown in FIG. 13 the furnace 28 may typically have a container or pot 130 with an open top 132, and in which lead is melted by heat produced typically by natural gas fired burners underlying and in some cases partially surrounding portions of the pot. Melted liquid lead from the furnace may be delivered by a molten lead pump assembly 134 to the strip caster 30 desirably without exposing the liquid lead to the atmosphere to at least substantially preclude migration of lead impurities and dross to the caster. The pump assembly 134 may have a centrifugal pump 136 with an inlet 138 submergible in the pool of liquid lead in the pot 130 of the furnace or in a holding well (not shown) of liquid lead transferred from the furnace. The pump may be driven by an electric motor 140 through a shaft connected to an impeller. Desirably the pump inlet 138 is positioned in the range of about ¼ to ¾ of the vertical height or extent of the pool of liquid lead in the furnace or holding well. Typically, the pump assembly 134 may deliver excess liquid lead to the casting machine 30 through a pipe or conduit 140 with the portion not used by the casting machine being returned to the furnace or holding well through a pipe or conduit 142 below the surface of the pool of molten lead in the melting furnace or holding well. If needed, the conduit 140 for delivering lead to the casting machine and the conduit 142 for returning excess liquid lead from the casting machine 30 may be thermally insulated and if needed equipped with heaters such as electric heaters to ensure that in use the lead remains in a liquid state and at a desirable temperature as it flows through the conduits to and from the casting machine. Typically, the pump assembly may deliver liquid lead to the casting machine at a pressure in the range of 30 to 40 psi gauge (207 to 276 kPa gauge) and a flow rate of 400 to 600 lbs. (181 to 272 kg) of liquid lead per minute. A suitable liquid lead transfer pump assembly is commercially available from the Applicant hereof, Wirtz Manufacturing Company of Port Huron, Michigan, USA. A suitable pump assembly is also believed to be disclosed in U.S. Pat. No. 7,507,367 the disclosure of which is incorporated herein by reference in its entirety.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A process of liquefying a plurality of pieces of scrap of lead or a lead alloy, the process comprising:
    heating a lead or lead alloy via a furnace to a temperature of at least 650° F. in order to provide a pool of liquid lead or lead alloy, the pool of liquid lead or lead alloy having a surface, the furnace having a pot with an open top;
    compacting a plurality of pieces of scrap of lead or lead alloy at room temperature into briquettes having a density of at least 10.3 g/cm³ and a weight of at least 1 kg, wherein the compacting is performed in the absence of preheating the plurality of pieces of scrap of lead or lead alloy prior to compacting; and
    dropping the briquettes from at least 0.15 meters above the surface of the pool and through the open top of the pot and into the pool through the surface of the pool, wherein the briquettes are submerged in the pool and completely below the surface of the pool and are melted therein.

2. The process of liquefying the plurality of pieces of scrap of lead or a lead alloy as set forth in claim 1, wherein compacting the plurality of pieces of scrap of lead or lead alloy involves compacting a sufficient quantity of pieces of scrap in order to form briquettes having a weight in the range of 2 kg to 25 kg.

3. The process of liquefying the plurality of pieces of scrap of lead or a lead alloy as set forth in claim 1, further comprising compacting the plurality of pieces of scrap of lead or lead alloy into briquettes having a density of at least 10.6 g/cm³.

4. The process of liquefying the plurality of pieces of scrap of lead or a lead alloy as set forth in claim 1, further comprising compacting the plurality of pieces of scrap of lead or lead alloy into briquettes having a density of at least 10.6 g/cm³ and a weight in the range of 2 kg to 25 kg.

5. The process of liquefying the plurality of pieces of scrap of lead or a lead alloy as set forth in claim 1, further comprising compacting the plurality of pieces of scrap of lead or lead alloy into briquettes having a density of at least 10.6 g/cm³ and a weight of at least 2 kg, and comprising submerging the briquettes in the pool of liquid lead or lead alloy at a rate of at least 1,900 kg of briquettes per hour.

6. The process of liquefying the plurality of pieces of scrap of lead or a lead alloy as set forth in claim 1, further comprising:
    casting from at least some of the liquid lead or lead alloy of the pool a longitudinally elongate solid strip of lead or lead alloy of a predetermined thickness;
    reducing the thickness of the solid strip;
    punching holes through the solid strip to form a web of a plurality of serially connected battery grids and produce a second plurality of pieces of scrap of lead or lead alloy punched from the solid strip;
    compacting the second plurality of pieces of scrap of lead or lead alloy at room temperature into second briquettes having a density of at least 10.3 g/cm³ and a weight of at least 1 kg; and
    dropping the second briquettes from at least 0.15 meters above the surface of the pool and through the open top of the pot and into the pool through the surface of the pool, wherein the second briquettes are submerged in the pool and completely below the surface of the pool and are melted therein.

7. A process of making a web of connected battery grids with lead or lead alloy, the process comprising:
    providing a pool of liquid lead or lead alloy, the pool of liquid lead or lead alloy having a surface;
    casting from at least some of the liquid lead or lead alloy of the pool a longitudinally elongate solid strip of lead or lead alloy of a predetermined thickness;
    reducing the predetermined thickness of the solid strip;
    punching holes through the solid strip to form a web of a plurality of serially-connected battery grids and producing a plurality of pieces of scrap of lead or lead alloy punched from the solid strip;
    compacting the plurality of pieces of scrap of lead or lead alloy at room temperature into briquettes having a density of at least 10.3 g/cm³ and a weight of at least 1 kg, wherein the compacting is performed in the absence of preheating the plurality of pieces of scrap of lead or lead alloy prior to compacting; and
    dropping the briquettes from at least 0.15 meters above the surface of the pool and into the pool through the surface, wherein the briquettes are submerged in the pool and completely below the surface and are melted therein.

8. The process of making the web of connected battery grids with lead or lead alloy as set forth in claim 7, wherein compacting the plurality of pieces of scrap of lead or lead alloy involves compacting a sufficient quantity of pieces of scrap in order to form briquettes having a weight in the range of 2 kg to 25 kg.

9. The process of making the web of connected battery grids with lead or lead alloy as set forth in claim 7, further comprising compacting the plurality of pieces of scrap of lead or lead alloy into briquettes having a density of at least 10.6 g/cm³.

10. The process of making the web of connected battery grids with lead or lead alloy as set forth in claim 7, further comprising compacting the plurality of pieces of scrap of lead or lead alloy into briquettes having a density of at least 10.6 g/cm³ and a weight in the range of 2 kg to 25 kg.

11. The process of making the web of connected battery grids with lead or lead alloy as set forth in claim 7, further comprising compacting the plurality of pieces of scrap of lead or lead alloy into briquettes having a density of at least 10.6 g/cm³ and a weight of at least 2 kg, and comprising submerging the briquettes in the pool of liquid lead or lead alloy at a rate of at least 1,900 kg of briquettes per hour.

* * * * *